(12) United States Patent
Ohtani et al.

(10) Patent No.: US 7,014,938 B2
(45) Date of Patent: Mar. 21, 2006

(54) SEPARATOR FOR FUEL CELL

(75) Inventors: Teruyuki Ohtani, Wako (JP); Makoto Tsuji, Wako (JP); Masao Utsunomiya, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 154 days.

(21) Appl. No.: 10/477,135

(22) PCT Filed: Jul. 22, 2002

(86) PCT No.: PCT/JP02/07396

§ 371 (c)(1),
(2), (4) Date: Nov. 7, 2003

(87) PCT Pub. No.: WO03/028133

PCT Pub. Date: Apr. 3, 2003

(65) Prior Publication Data

US 2004/0146767 A1    Jul. 29, 2004

(30) Foreign Application Priority Data

Sep. 19, 2001 (JP) .............................. 2001-285138

(51) Int. Cl.
*H01M 2/00* (2006.01)

(52) U.S. Cl. .................. 429/34; 429/247; 429/129
(58) Field of Classification Search .............. 429/34, 429/247, 129
See application file for complete search history.

(56) References Cited

FOREIGN PATENT DOCUMENTS

| JP | 55-48494 | * | 4/1980 |
|----|----------|---|--------|
| JP | 62-010868 |   | 1/1987 |
| JP | 05-029009 |   | 2/1993 |
| JP | 2000-182640 |   | 6/2000 |
| JP | 2001-093538 |   | 4/2001 |
| JP | 2001-297777 |   | 10/2001 |
| JP | 2002-260681 |   | 9/2002 |

* cited by examiner

*Primary Examiner*—Laura Weiner
(74) *Attorney, Agent, or Firm*—Arent Fox PLLC

(57) ABSTRACT

A separator for fuel cells which has a gold covering layer on the surface of a metal plate and is formed by plastic working, wherein the relationship $(R+D)/R \leq 1.025$ ($50\,\mu m \leq R \leq 1000\,\mu m$) is satisfied assuming the minimum bending radius R at a plastic worked portion is R ($\mu m$), and the thickness of the gold covering layer is D ($\mu m$). According to the separator for fuel cells, exfoliation or cracking is prevented in the gold covering layer after plastic working, whereby corrosion resistance and durability can be remarkably improved.

2 Claims, 1 Drawing Sheet

US 7,014,938 B2

SEPARATOR FOR FUEL CELL

TECHNICAL FIELD

The present invention relates to a separator for fuel cells such as solid polymer electrolyte fuel cells.

BACKGROUND ART

In solid polymer electrolyte fuel cells, a separator is applied to both sides of a plate-shaped electrode (MEA: Membrane Electrode Assembly) to form a unit having a layered structure, and the plural units are stacked to form a fuel cell stack. The MEA is a three-layered structure in which a polymerized electrolytic membrane, which is made of a resin such as an ion-exchange resin, is held by a pair of gas diffusion electrode plates (positive electrode plate and negative electrode plate). The gas diffusion electrode plate is formed of a gas diffusion layer formed outside of a catalytic layer which contacts the polymerized electrolytic membrane. The separator is layered so as to contact the gas diffusion electrode plate of the MEA, and gas passages and coolant passages where gases are circulated between the gas diffusion electrode plate and the separator are formed. In this fuel cell, hydrogen gas as a fuel is provided to the gas passages facing the gas diffusion electrode plate at the negative electrode side, and an oxidizing gas such as oxygen or air is provided to the gas passages facing the gas diffusion electrode plate at the positive electrode side, and electricity is thereby generated by electrochemical reaction.

The separator must have characteristics such that electrons generated by the catalytic reaction of the hydrogen gas at the negative electrode side are supplied to an external circuit, while electrons from the external circuit are supplied to the positive electrode side. As the separator, electrically conductive materials such as carbon type materials or metal type materials are used. In particular, the metal type materials are advantageous because they have excellent mechanical strength and allow weight reduction and compact design when formed in a thin plate shape. A thin plate which is made from metallic materials with high-corrosion resistance, such as stainless steels and titanium alloys, and is formed into a corrugated plate, may be mentioned as the metallic separator.

The following three factors may be mentioned when separators are exposed to operating conditions.

(1) Temperature: Since the operating temperature of the fuel cell is between room temperature and approximately 180° C., the separators are exposed to temperatures in this range.

(2) pH: In the fuel cell, water is produced by reaction of oxygen and hydrogen, and the water is emitted in the form of a vapor. When the temperature of the water vapor in gas passages formed in the separator decreases, condensed water adheres to the separator in droplets. The water accumulates between the MEA and the separator when the amount of water adhering increases. Then, the water adhering to the MEA readily contacts the polymerized electrolytic membrane. As a result, separation, or the like, in a substituent in the polymerized electrolytic membrane occurs, and the pH of the adhering water decreases due to the generation of hydrogen ions in the adhering water. As the substituent in the fuel cell, a sulfone group is typical, and as the above-mentioned adhering water, an acid liquid such as sulfuric acid is common.

The above-mentioned substituent is explained as follows. In the fuel cell, the cathode catalyst is supplied with hydrogen ions by transporting hydrogen ions, which are generated from hydrogen on the catalyst at the hydrogen gas supply side (anode side), to the oxidized gas supply side (cathode side). Then, by reacting the hydrogen ion and the oxidizing gas on the cathode catalyst, the action of generating water is made to be the driving force, so that electrical power is continuously generated. Therefore, the polymerized electrolytic membrane of the fuel cell must be a polymerized electrolytic membrane of a positive ion conductive type which can move the hydrogen from the cathode side to the anode side. Therefore, in the side-chain of the polymerized electrolytic membrane molecule, the combination group of the form which combines with the hydrogen ion must exist. In the fuel cell, the above-mentioned function is satisfied by arranging a part of the molecule of the polymerized electrolytic membrane as the substituent of an acid type which combines with hydrogen ions. Since this substituent is of an acid type, when it is liberated from the polymerized electrolytic membrane, an acid is generated. Generally, as this substituent, one of a strong acid type which has strong binding ability with hydrogen ions is used in order to improve transfer efficiency of the hydrogen ion, and therefore, this substituent is liberated and generates the acid, and the acid has a low pH.

(3) Potential: The separators are placed at the fuel gas side and the oxidized gas side, and each side forms the positive electrode or the negative electrode of the fuel cell. Between the separators, an electromotive force obtained in the reaction is generated as a potential difference. Generally, a potential difference obtained by an electromotive force in the fuel cell which uses hydrogen as the fuel gas and oxygen as the oxidizing gas is about 1.2 V at most for the following reason. That is, it is believed that the electromotive force obtained in the chemical reaction in which water is generated from hydrogen and oxygen is about 1.2 V in the operational temperature range of a fuel cell from theoretical calculations, and in actual power generation, it is similar to this numerical value, and an electromotive force of about 1 to 1.2 V is generated. When an austenitic stainless steel plate with high corrosion resistance is used as the separator, the dissolution rate of metal ions increases when the electromotive force exceeds about 0.9 V, thereby causing corrosion.

The separator for fuel cells is exposed to a corrosive environment depending on each factor of temperature, pH, and potential as mentioned above. Therefore, when a metallic separator is used, even if the separator is composed of a material (for example, SUS316L) which has high corrosion resistance, the separator is easily corroded. Therefore, for the separator, a corrosion resistance which is extremely high under the operating conditions of fuel cells is required. In addition, it is necessary that press working of the separator be easily form a corrugated plate to form the gas passages and the coolant passages, and that the contact resistance with other members be extremely small in order to avoid decrease of the power generation voltage. In addition, it is also necessary that the separator be low in cost, because several hundred separators may be used in one fuel cell stack.

It is believed that separators plated with high corrosion resistance metal on the surface of the stainless steel plate in which press working is easy are desirable as separators for fuel cells. The comparison with respect to the corrosion resistances of SUS316L of stainless steel, Cu, Ag, Pt, and Au was carried out under conditions of pH 3 sulphuric acid solution of 90° C. and corrosion current density of 1.2 V, and by respectively measuring these conditions. The following results were obtained: SUS316L: 156 $\mu A/cm^2$, Cu: 98 $\mu A/cm^2$, Ag: 38 $\mu A/cm^2$, Pt: 18 $\mu A/cm^2$, Au: 2 $\mu A/cm^2$. It is desirable that the corrosion current density be 10 $\mu A/cm^2$ or less in view of ensuring practical durability. It has been demonstrated that a metal which satisfies these conditions is gold. Therefore, a separator plated with gold on the surface of a material such as the stainless steel plate is promising as a separator for fuel cells.

However, it can be said that adhesion is not very good when gold plating is performed on stainless steel by conventional methods, because the gold plating only physically adheres to the stainless steel. Therefore, when a separator in which an extremely small radius of curvature at a bend in a corrugated cross section is formed by press working, the gold plating is easily exfoliated and cracks due to failure of adhesion. When exfoliation occurs, the contact resistance between the gold plating and stainless steel plate, which is the base metal, increases, and low contact resistance cannot be obtained. Thus, it is not possible to satisfy necessary corrosion resistance requirements for the fuel cell when the exfoliated gold plating falls off and when cracks in the plating layer during press working are formed because exposed stainless steel plate is easily corroded.

DISCLOSURE OF THE INVENTION

Therefore, an object of the present invention is to provide a separator for fuel cells which can prevent a gold plating layer (gold covering layer) from exfoliating or cracking after plastic working, whereby corrosion resistance and durability can be improved remarkably.

The present invention controls a thickness of a gold covering layer, in which exfoliation or cracking can be prevented in the gold covering layer, based on a thickness of the gold covering layer and a minimum bending radius R at a plastic worked portion of the metal plate, at which maximum elongation is generated when performing plastic working on a separator having a metal plate such as a stainless steel plate and a gold covering layer formed on the surface of the metal plate. As shown in a separator 10 in FIG. 1, assuming that R ($\mu$m) is a minimum bending radius of a metal plate 1 at a plastic worked portion 10A of the separator 10 and D ($\mu$m) is a thickness of a gold covering layer 2, an expression of a ratio of elongation of a B–B' surface cross section and elongation of a A–A' interface cross section between the metal plate 1 and the gold covering layer 2 is (R+D)/R. The applicants have found that exfoliation or cracking can be remarkably prevented in the gold covering layer 2 after plastic working when the above ratio is 1.025 or less, and have thereby completed the present invention.

That is, the present invention provides a separator for fuel cells, which is formed by plastic working, comprising: a metal plate; a gold covering layer formed on a surface of the metal plate, the layer having a thickness D ($\mu$m); and a plastic worked portion formed by the plastic working, the portion having the minimum bending radius R ($\mu$m), wherein the thickness D of the gold covering layer and the minimum bending radius R at the plastic worked portion satisfy the following equation.

$(R+D)/R \leq 1.025$

Since the contact resistance of the separator is required to be small, the minimum bending radius R is set as small as possible, whereby it is necessary to enlarge the contact area of the separator. Thus, the range of the minimum bending radius R is controlled as below.

$50 \ \mu m \leq R \leq 1000 \ \mu m$

BEST MODE FOR CARRYING OUT THE INVENTION

An embodiment of the present invention will be explained in detail hereinafter with reference to a concrete example.

A large number of test pieces were prepared, which were composed of stainless steel (which corresponds to SUS316L) with the composition shown in Table 1 and which were 100 mm×100 mm square plates having a thickness of 0.2 mm.

TABLE 1

| Composition of test pieces (stainless steel plates) (mass %) | | | | | | | | |
|---|---|---|---|---|---|---|---|---|
| C | Si | Mn | P | S | Ni | Cr | Mo | Fe |
| 0.03 | 0.5 | 2 | 0.04 | 0.03 | 13 | 17 | 2.5 | Balance |

A gold plating layer (gold covering layer) was formed on the surfaces of the above test plates by appropriately changing the thickness of the gold plating layer. Molten salt of the gold plating layer contained gold potassium cyanide: 12 g/l, potassium citrate: 125 g/l and EDTA cobalt salt: 3 g/l, and the thickness of the gold plating layer was adjusted appropriately by changing the temperature of the molten salt, current density and time. Next, the test pieces were divided into groups which were respectively composed of test pieces having different thicknesses from each other, and bending of the test pieces was performed for each group, using metallic molds which have different minimum bending radii R at a bending portion thereof, so that the gold plating layer is positioned outside of the test piece. The metallic molds were of six types which have the minimum bending radii R of 50 $\mu$m, 100 $\mu$m, 200 $\mu$m, 400 $\mu$m, 700 $\mu$m, and 1000 $\mu$m at the bending portions thereof.

Figure 1:
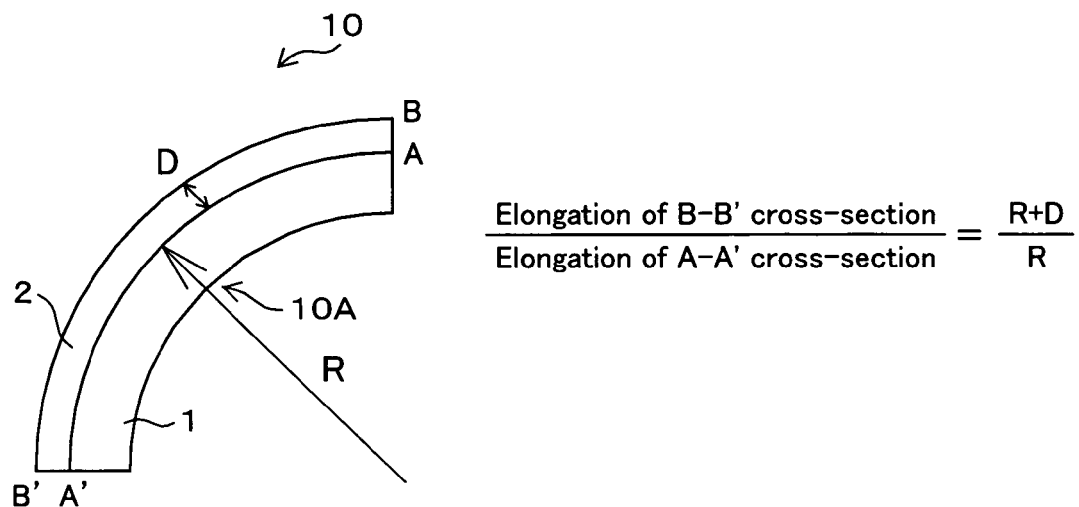
FIG. 1 is a cross sectional diagram of a plastic worked portion of a separator for explaining an expression (R+D)/R of the present invention, assuming that R ($\mu$m) is a minimum bending radius at a plastic worked portion, and D ($\mu$m) is a thickness of a gold plating layer.
Figure 2:
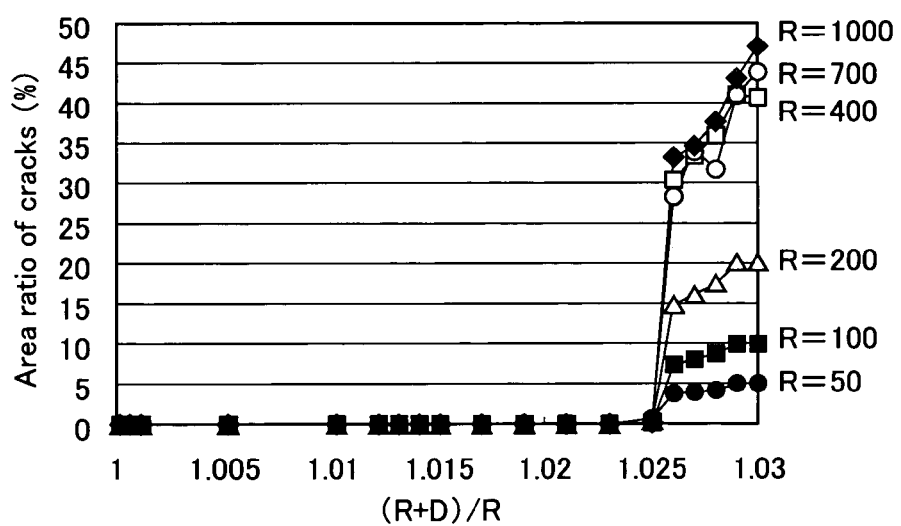
FIG. 2 is a diagram showing a relationship between values of the expression (R+D)/R and area ratio of cracks generated in the gold plating layer in an embodiment according to the present invention.

After bending, area ratios of cracks generated in a gold plating layer of the test pieces were examined. The relationship between the values of the expression (R+D)/R and the area ratio of cracks generated in a gold covering layer was examined, assuming that R ($\mu$m) is a minimum bending radius R at a plastic worked portion of the test piece which is formed by the above bending, and D ($\mu$m) is a thickness of the gold covering layer. The results are shown in FIG. 2.

It was confirmed that the area ratio of cracks was 0 or approximately 0 when the value of the expression (R+D)/R is 1.025 or less, and the area ratios of cracks remarkably increase when the value of the expression (R+D)/R exceeds 1.025. Therefore, it was confirmed that exfoliation or cracking can be prevented in the gold plating layer when the minimum bending radius R at the plastic worked portion and the thickness D of the gold covering layer satisfy the following expression, whereby corrosion resistance and durability can be improved remarkably.

$(R+D)/R \leq 1.025$

The invention claimed is:

1. A separator for fuel cells, which is formed by plastic working, comprising:
   a metal plate;
   a gold covering layer formed on a surface of the metal plate, the layer having a thickness D ($\mu$m); and
   a corrugated form in cross section, which is formed by performing the plastic working on the metal plate having the gold covering layer on the surface of the metal plate, the corrugated form having an edge having a minimum bending radius R ($\mu$m),
   wherein the thickness D of the gold covering layer and the minimum bending radius R at the edge of the corrugated form satisfy the following equation:

$(R+D)/R \leq 1.025$ $50\ \mu m \leq R \leq 1000\ \mu m$.

2. A method of making a separator for fuel cells, comprising:
   forming a gold covering layer on a surface of a metal plate, the layer having a thickness D ($\mu$m); and
   performing plastic working on the metal plate having the gold covering layer on the surface thereof so that the metal plate has a corrugated form in cross section, the corrugated form having an edge having a minimum bending radius R ($\mu$m),
   wherein the thickness D of the gold covering layer and the minimum bending radius R at the edge of the corrugated form satisfy the following equations $(R+D)/R \leq 1.025$ $50\ \mu m \leq R \leq 1000\ \mu m$.

* * * * *